Feb. 28, 1967  R. W. REID ETAL  3,306,777
FLAT CELL PACK BATTERY HAVING A CUSHIONING MEANS
Filed Jan. 14, 1965  2 Sheets-Sheet 1

INVENTORS.
RAYMOND W. REID and
WRIGHT R. FENELEY
BY Edward E. Schilling
Agent

INVENTORS.
RAYMOND W. REID and
WRIGHT R. FENELEY
BY
Edward E. Schilling
Agent

United States Patent Office 3,306,777
Patented Feb. 28, 1967

1

3,306,777
FLAT CELL PACK BATTERY HAVING A CUSHIONING MEANS
Raymond W. Reid, Sanford, and Wright R. Feneley, Midland, Mich., assignors to The Dow Chemical Company, Midland, Mich., a corporation of Delaware
Filed Jan. 14, 1965, Ser. No. 425,543
5 Claims. (Cl. 136—111)

The invention relates to an improved flat cell pack battery employing magnesium or magnesium alloy anodes.

For the purposes of the specification and claims, magnesium and magnesium-base alloys containing at least 70 percent of magnesium are hereinafter referred to as magnesium metal.

Dry cell batteries which employ magnesium as the anode metal are desirable because such dry cells having equivalent capacity to dry cells containing zinc provide a higher voltage potential, are lighter in weight and smaller in size. However, two problems arise in constructing dry cells containing magnesium which seemingly call for mutually inconsistent solutions. The expansion and gassing of magnesium cells during discharge require provisions for expansion within the pack as well as provision for venting of hydrogen. But the use of a moist mix cake or electrolyte paste requires a construction designed to retain moisture or at least minimize the loss thereof. On providing for minimal moisture loss, it is difficult to provide for either proper venting or expansion.

It is, therefore, a principal object of this invention to provide a flat cell pack battery construction and method of assembly which overcomes the above-described problems in the same assembly of parts.

Figure 1:
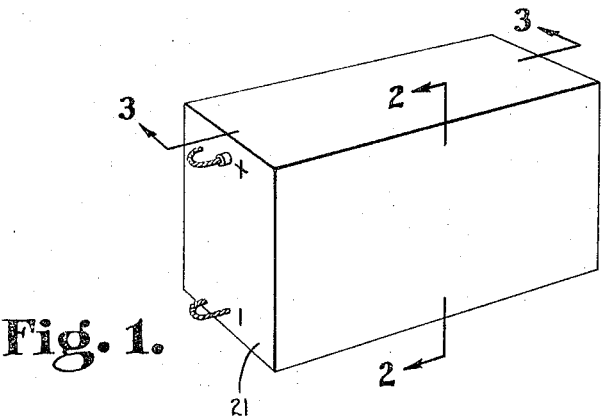
Figure 2:
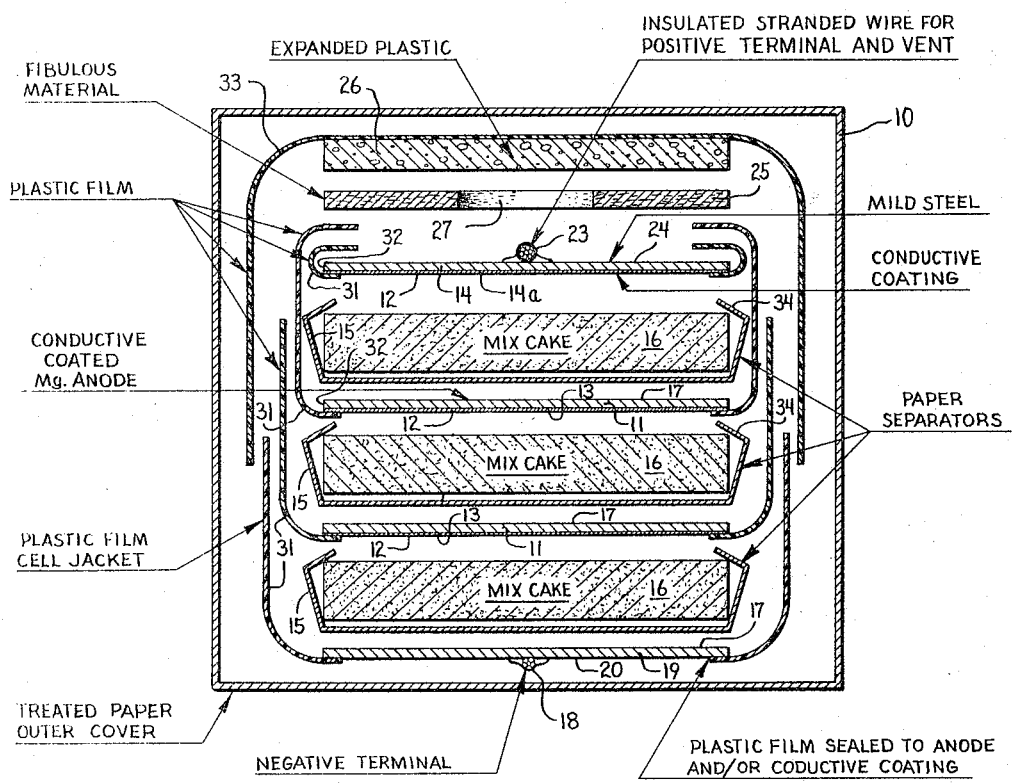
Figure 3:
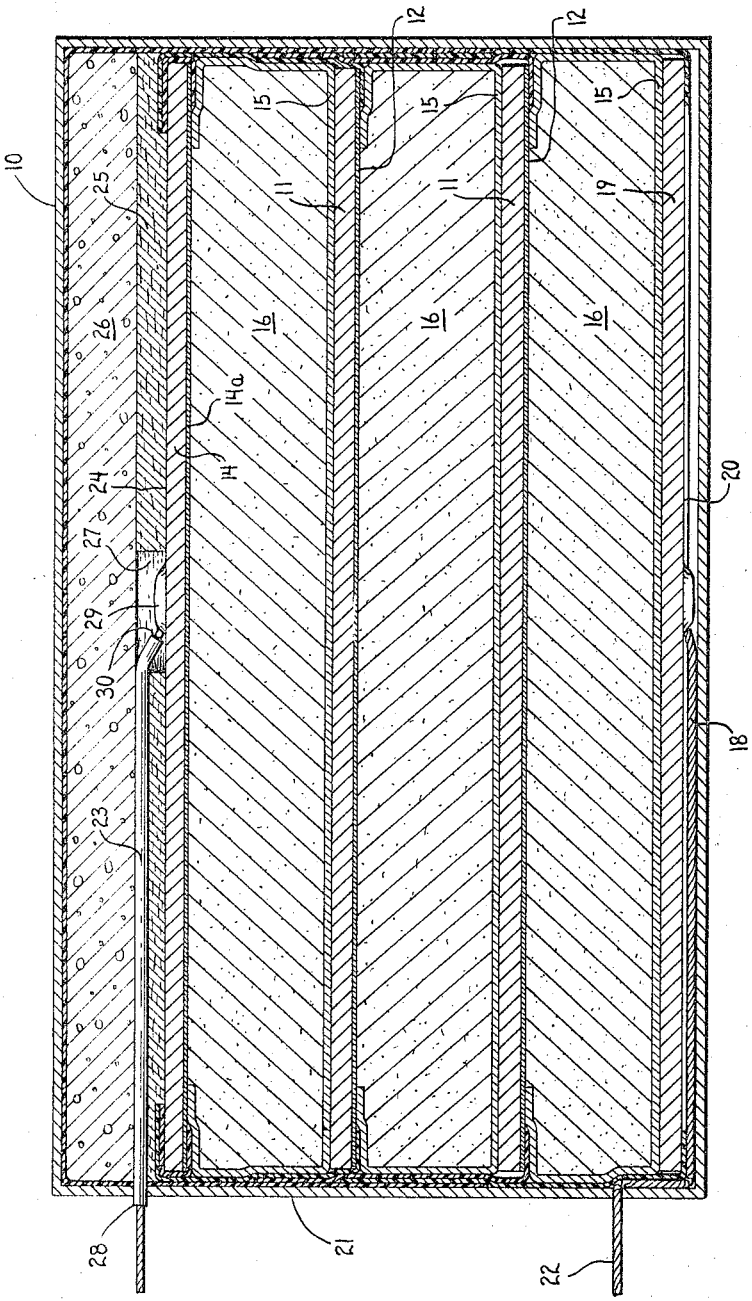

This and other objects and advantages of the present invention will be apparent to those skilled in the art upon becoming familiar with the following description and claims and the drawings in which FIG. 1 is a perspective view of a flat cell pack battery;

FIG. 2 is an expanded, enlarged sectional view through the battery of FIG. 1 taken along lines 2—2 of FIG. 1; and FIG. 3 is a sectional view taken along lines 3—3 of FIG. 1 and even further enlarged than FIG. 2 in order to more clearly show some of the details of construction.

The invention is based upon the discovery that upon providing within the flat cell pack battery envelope a cushioning means such as a layer of an expanded plastic for the battery materials to expand against and on employing plastic films sealed to the edges of the anodes in each cell and disposed so as to direct gases formed in the cells to bibulous fibrous material having disposed therein an insulated stranded electrical lead which communicates with the exterior of the sealed battery envelope, there is provided within the same assembled structure a flat cell pack battery structure which achieves the objectives recited above.

The details of the construction of the present novel battery will be better understood with reference to FIGS. 2 and 3. Referring now to FIG. 2, the battery consists of an external cover 10, generally formed of a heavy duty wax or plastic impregnated paper or other non-conductive covering material or, for example, a steel jacket electrically insulated from the other parts of the battery structure, having disposed inside a plurality of magnesium metal anodes 11, 19, each of anodes 11 being a plate having a water-impervious conductive carbonaceous coating layer 12 on one side 13 thereof, a cathode collector plate 14 of magnesium metal, carbon, or more usually, mild steel also having a water-impervious conductive carbonaceous coating layer 12 on one side 14a thereof, porous paper separators 15 separating each layer of mix cake 16 from the uncoated side 17 of each magnesium metal anode. There is also provided a negative lead wire 18 electrically connected as by soldering or spot welding it to the bounding magnesium anode 19 at one side of the stack of cells forming the battery and on the side 20 of the anode 19 away from the mix cake 16.

The negative electrical lead 18 as shown in FIG. 3 is electrically connected about centrally to the magnesium anode 19 and is disposed within the cell sandwiched between the cover 10 and the anode 19 to which it is attached and is directed up to an end 21 of the battery where the negative electrical lead extends through the cover 10 so that it can be used as a terminal 22 or attached to a suitable connecting device. Lead wire 18 also serves as a vent for gases generated in the pack and not otherwise vented. The other lead wire 23, which serves also as a vent, is insulated stranded wire which, as shown in FIGS. 2 and 3, is electrically connected to the cathode collector plate 14 as by soldering or spot welding at about the center of the side 24 away from the adjacent mix cake 16. Disposed between the cathode collector plate 14 and its attached positive lead wire 23 is a layer of bibulous, fibrous, moisture absorbent material 25 which extends substantially coextensively with the adjacent cathode collector plate 14. Disposed between the layer of bibulous material 25 and the adjacent side of the battery pack is cushioning means 26 in the form of a layer of expanded plastic or other resiliently firm, yet readily compressible material. This layer of compressible material 26 is substantially coextensive with the layer of bibulous material 25. As shown in FIG. 3, the insulated positive lead wire 23 extends through an opening 27 in the layer of bibulous material 25 and is led up to the end 21 of the battery pack sandwiched between the layer of bibulous material 25 and the layer of compressible material 26. To assure proper functioning of the insulated wire 23 as a vent, it must be cut so that the insulation extends through the end 21 of the battery pack and care must be taken in any subsequent wax coating or impregnation of the finished pack to avoid sealing the stranded wire around the exposed end 28 of the insulating cover. Likewise, it is important in electrically connecting the positive lead wire 23 to the cathode collector plate 14 to leave a short length of at least 1/16 to 1/8 inch of exposed wire between the bead of solder 29 and the end 30 of the insulation covering as illustrated in FIG. 3. Likewise care must be taken in coating or impregnating the finished pack to avoid sealing the electrical lead 18, and to that end it is usually desirable to provide an impervious sleeve or envelope for the portions of such stranded wire extending through the cover 10 and externally exposed.

Special features of the present invention include the use of plastic film to retain the moisture in the mix cake and to prevent intercell shorting through an unintended electrolyte path, as well as to direct gases formed on discharge to the insulated lead wire 23 for proper venting. Referring again to FIG. 2, it is seen that each of the magnesium anodes 11, 19 and the collector plate 14 are provided with edge flaps 31 of plastic film which are each cemented or bonded or otherwise sealingly attached to, or immediately adjacent to, the edges 32 of each metal plate and folded around the edges of the plates so that all of the flaps 31 extend in the same direction in an overlapping manner. Gases formed on discharge bleed or escape between the layers of plastic films 31 so as to reach the bibulous material 25 which lies sandwiched between the collector plate 14 and the cushioning means 26. To further direct the movement of gases within the cell and to avoid or minimize moisture loss, a plastic film 33 is provided which extends entirely over the cushioning means 26 and inside the external cover 10 and further extends along the sides of the stack in such a manner as to overlap the particular edge flaps 31 which extend from the farthest removed magnesium metal anode 19. In this fashion the active parts of the battery are completely enclosed by the overlapping plastic films.

The magnesium metal anodes 11, 19 may be formed of any suitable magnesium alloy, for example, the quick-acting alloy containing aluminum and minor amounts of indium. Suitable alloys are described in U.S. Patents 2,934,583 and 3,038,019.

The cushioning means 26 is formed of any compressible non-conductive material which exhibits substantial compression strength, but is yieldingly compressible. While a pad formed of jute or sisal fibers or horsehair or shredded rubber or latex impregnated natural fibers may be used, it is preferred to use a material which exhibits a relatively high threshold resistance to compression, yet a relatively constant progression in resistance to compression, once threshold pressure is exceeded, until the material has undergone a very substantial reduction in thickness, e.g., 75 to 90 percent reduction. Therefore, the ratio of total void space to volume occupied by solid matter in the material is preferably quite high, e.g., at least 4:1. Preferably the material exhibits a resilient resistance to compression such that it is not compressed more than one-third under a load of 25 to 50 pounds per square inch. It is also highly desirable to use a non-absorbent material which will not take up moisture from the mix cake.

The materials which appear to best exhibit the foregoing desired properties are the resilient expanded, or foamed, synthetic plastics, e.g., Pelaspan expanded polystyrene, or expanded plasticized polyvinylchloride. Such expanded plastics are cellular, generally having closed or substantially closed cells. Brittle materials are generally to be avoided as they tend to compress irreversibly or to simply break down into particulate material. In general, those expanded plastics which are so brittle or rigid that a layer of the material will break or crack when bent over a mandrel having a radius ten times the thickness of the layer may be usable for batteries in very light service, but will not withstand normal or heavy service involving moderate to rough handling, or jarring.

Generally, a layer of compressible material at least one-eighth inch thick must be used. A layer of about one-quarter to one-half inch thick is suitable for most batteries. A layer thicker than about one-half inch may be used where space requirements permit, but the additional thickness is of no marked advantage.

The bibulous material 21 is formed of a fibrous or porous material such as Webril matted cellulose fibers, or other highly absorptive material. It is highly important that the bibulous material permit the passage of gases therethrough while tending strongly to retain moisture.

The plastic films may be of any suitable film former which yields a pliable, sturdy plastic film. Suitable plastic films include those formed of polyvinylchloride, polyethylene, polypropylene and copolymers of polyvinylchloride and polyvinylacetate.

The conductive coating applied to the backs of the magnesium anodes consists of a suitable adherent resin or wax having incorporated therein from about 50 to 80 percent of carbon black as more fully described in U.S. Patent 2,745,774, which is hereby incorporated by reference. Such coating is essentially substantially impervious to moisture from the mix cake.

The mix cake may be made up of any suitable composition normally employed for primary dry cells having magnesium anodes. Such mix cake is also known as a depolarizing mass. The mix cake is made up from a mixture of manganese dioxide and carbon black which is readily compressed or molded into cake form after being moistened with the electrolyte. A suitable mixture contains from 75 to 95 percent by weight manganese dioxide and the balance carbon black. A desirable mixture consists of 90 percent by weight $MnO_2$ (gold coast ore) and 10 percent acetylene black.

The electrolyte is prepared by dissolving an alkali metal bromide, alkaline earth metal bromide or ammonium bromide in water in a concentration between about 30 grams per liter and that producing a nearly saturated solution at ordinary temperatures. The actual concentration used does not appear to be critical, although for best results certain concentrations are to be preferred depending upon the particular bromide or combination of bromides used. For example, preferred concentrations of the alkali metal bromides are from about 150 to 500 grams of the salt per liter of solution. Of the alkali metal bromides lithium bromide produces the most desirable results, particularly in concentrations of about 300 grams per liter. Similar concentrations may be used with the alkaline earth metal bromides, which include the bromides of magnesium, calcium, barium and strontium. Of these, magnesium bromide is to be preferred. Its most effective concentration is about 300 grams per liter of solution.

While a single bromide may be used as the electrolyte, better results are had with combinations of the aforesaid bromides, particularly combinations of an alkali metal bromide with an alkaline earth metal bromide, such better results being manifested in greater shelf life and higher capacity.

It is desirable to include in the electrolyte an alkali metal, alkaline earth metal or ammonium, salt of chromic acid in corrosion inhibiting amounts, such as from 0.01 gram per liter of solution to concentrations producing saturation in the presence of the bromide therein. A preferred concentration of the chromic acid salt is 0.05 to 2 grams per liter of solution. A number of specific suitable electrolyte compositions are set forth in U.S. Patents 2,547,907 and 2,547,908.

The porous separator is formed of a layer of blotter-like material, such as a kraft paper about 6 to 12 mils thick which is highly porous and of a type normally used in such battery construction. A thicker layer of separator material may be used, if desired. The porous separator is thoroughly wetted with electrolyte and serves to hold the electrolyte in place between the immediately adjacent metal anode and the mix cake.

The pack is best assembled by starting at the negative end or side with magnesium anode 19. With the anode 19 lying horizontal with the attached uninsulated lead wire 18 lying on the underneath side, a paper separator 15 moistened with the electrolyte is formed into an open envelope with its sides slightly deeper than the expected thickness of the mix cake to be placed on the anode. The moist mix cake 16 is placed into this envelope and the next magnesium anode 11 is laid on this cake with the conductive coated side 13 facing the mix cake and with the edges 34 of the paper envelope preferably tucked in between the mix cake and the anode to avoid migration of mix cake. Another moistened paper separator 15 is formed into an open top envelope on top of this anode and the procedure is repeated until the desired nominal voltage is obtained by constructing the requisite number of cells in series employing the requisite number of anodes. The cathode or end collector plate 14 with the insulated stranded wire 23 attached is used for the last electrode and is placed atop the last or uppermost layer of mix cake. The plastic film edge flaps attached to the backside or conductive coated side of each anode and of the end collector plate 14 are each folded toward the end collector plate 14. Those edge flaps extending past the end collector plate are folded around the edge thereof. Then a piece of bibulous material 25, of substantially the same length and width as the anodes, and having a hole 27 cut from its center so it does not contact the weld bead by which the stranded wire 23 is attached to the collector plate 14, is placed in face-to-face relationship with the end collector plate 14 with the lead wire 23 extending through the said hole. The lead wire 23 is then stretched up to one end of the assembly and the expansion cushion 26 cut the same size as the electrodes and having a selected thickness predetermined by the expected expansion during the life expectancy of the battery is placed over and aligned with the bibulous material 25 and the rest of the pack. The pack is then bound together, care being taken to also bring the uninsulated lead wire 18 up to the end of the pack. Generally, the heavy duty paper or cardboard or insulated metal cover 10 is folded together tightly and cemented with a resin sealer or otherwise fixed in place. The complete pack is made moisture imprevious as by dipping the pack into molten microcrystalline wax or other suitable coating material, being sure the exposed ends of the stranded wires are not impregnated with the coating material at the point where they emerge from the pack.

The device comprising this invention having been thus fully described, various modifications thereof will at once be apparent to those skilled in the art, and the scope of the invention is to be considered limited only by the scope of the hereafter appended claims.

We claim:
1. The improved flat cell pack battery which comprises in assembly an array of plates disposed in parallel juxtaposed spaced apart relation and consisting of an uppermost plate, a lowest plate and at least one intermediate plate; said uppermost plate being a cathode collector plate formed of an electrically conductive material; said intermediate and lowest plates being anodes formed of magnesium metal; each said plate having an upper and a lower surface; each said plate except the lowest having a moisture-impervious, conductive, carbonaceous coating bonded to the entire lower surface thereof;
   a cathode-depolarizer mix cake disposed between each metal plate in the array; each said mix cake being surrounded by a porous envelope on all sides except the side contacting the immediately adjacent conductive coated metal plate, each said envelope and mix cake being moistened with an aqueous electrolyte;
   a sheet of bibulous material overlying the upper surface of said cathode collector plate and being substantially coextensive therewith;
   cushioning means at least ⅛-inch thick and having substantially the length and width of said cathode collector plate superposed on said sheet of bibulous material;
   flexible gas directing means sealingly attached to the conductive coated side of each metal plate adjacent each edge of such plate, each said gas directing means having the form of a moisture impervious plastic film of larger dimensions than the metal plate to which the film is attached and having an opening formed therethrough smaller than said metal plate, each cathode-depolarizer mix cake being permitted to contact the adjacent conductive coated surface of a metal plate, the edge portions of each said plastic film being folded upwardly around the edges of the metal plate to which said film is attached and said edge portions extending upwardly at least past the next adjacent spaced apart metal plate, the edges of the plastic films of said cathode collector plate and of the next adjacent anode being tucked in between said sheet of bibulous material and the cathode collector plate;
   additional gas directing means in the form of a moisture impervious plastic film coextensive with and surrounding the top of said assembly, said additional gas directing means outwardly overlapping in an opposite direction the gas directing means attached to said lowest plate;
   a substantially water and gas impervious envelope completely enclosing said assembly;
   a stranded electrical lead surrounded by a gas-impervious electrically insulating envelope conductively attached to said cathode collector plate, said stranded electrical lead extending through an opening in said sheet of bibulous material and further being disposed between said sheet of bibulous material and said cushioning means and extending through said enclosing water and gas impervious envelope to the outside of the battery, said lead being the positive terminal and a gas vent;
   and a second electrical lead conductively attached to the lower surface of said lowest plate and being substantially disposed between said lowest plate and the enclosing water and gas impervious envelope and extending therethrough said envelope to the outside of the battery, said second lead being the negative terminal.

2. The improved flat cell battery as in claim 1 in which the cushioning means is an expanded, cellular plastic material.

3. The improved flat cell battery as in claim 1 in which the second electrical lead attached to the lower surface of the lowest plate is a stranded wire, said wire being a gas venting means as well as negative terminal.

4. The improved flat cell battery as in claim 1 in which the cathode collector plate is a ferrous metal.

5. The improved flat cell battery as in claim 1 in which the cushioning means is at least ¼-inch thick.

References Cited by the Examiner
UNITED STATES PATENTS

| | | | |
|---|---|---|---|
| 2,649,492 | 8/1953 | Linton et al. | 136—111 |
| 2,889,389 | 6/1959 | Tamminen | 136—111 |
| 3,081,369 | 3/1963 | Coleman et al. | 136—111 X |

WINSTON A. DOUGLAS, *Primary Examiner.*

B. OHLENDORF, *Assistant Examiner.*